(12) United States Patent
Clouser et al.

(10) Patent No.: US 6,183,607 B1
(45) Date of Patent: Feb. 6, 2001

(54) ANODE STRUCTURE FOR MANUFACTURE OF METALLIC FOIL

(75) Inventors: Sidney J. Clouser, Chardon; Jiangtao Wang, Cleveland, both of OH (US); John C. Briggs, Chandler; Michael L. Stevens, Mesa, both of AZ (US)

(73) Assignee: GA-TEK Inc., Eastlake, OH (US)

( * ) Notice: Under 35 U.S.C. 154(b), the term of this patent shall be extended for 0 days.

(21) Appl. No.: 09/337,576

(22) Filed: Jun. 22, 1999

(51) Int. Cl.$^7$ .................................................. C25D 17/12
(52) U.S. Cl. .......................... 204/199; 204/206; 204/211; 204/212; 204/213; 204/216; 204/242; 204/280; 204/281
(58) Field of Search .................................... 204/199, 206, 204/211, 212, 213, 216, 242, 280, 281

(56) References Cited

U.S. PATENT DOCUMENTS

| | | | |
|---|---|---|---|
| 4,661,230 | * 4/1987 | Podrini | 204/206 |
| 5,628,892 | * 5/1997 | Kawashima et al. | 204/280 |
| 5,716,502 | * 2/1998 | Ameen et al. | 204/211 |
| 5,783,058 | * 7/1998 | Fowler et al. | 204/212 |
| 5,833,819 | * 11/1998 | Ohara et al. | 204/212 |
| 5,944,965 | * 8/1999 | Ameen et al. | 204/206 |

* cited by examiner

Primary Examiner—Bruce F. Bell
(74) Attorney, Agent, or Firm—Mark Kusner; Michael A. Centanni (57) ABSTRACT

An electrodeposition cell for electrodepositing metal onto a surface of a rotating drum that is partially immersed in an electrolytic solution. The cell includes an anode comprised of a main anode body portion and an anode extension portion. The main anode body portion has an arcuate main anode body surface having a radius of curvature slightly larger than the radius of curvature of the drum. The main anode body portion is totally immersed in the electrolytic solution adjacent the drum wherein a generally uniform gap is formed therebetween. The anode extension portion has an anode extension surface facing the drum and at least one opening extending therethrough. The anode extension portion is disposed within the electrolytic solution wherein a portion thereof extends above the electrolytic solution and the electrolytic solution can flow through the opening. A power source is connected to the main anode body portion and the anode extension portion to produce a like potential on the anode body surface and the anode extension surface, wherein the main anode body portion produces a first current density on the drum in a zone where the drum and the main anode body portion are adjacent and the anode extension portion produces a second current density on the drum in a zone where the drum and the anode extension portion are adjacent. The second current density is equal to or less than the first current density.

20 Claims, 5 Drawing Sheets

ANODE STRUCTURE FOR MANUFACTURE OF METALLIC FOIL

FIELD OF THE INVENTION

The present invention relates generally to processes for electrodepositing metal, and more particularly, to an anode for use in such processes. The present invention is particularly applicable in forming high quality, porous-free, thin copper foil and will be described with particular reference thereto; it being understood, however, that the present invention may also find advantageous application in electroforming other metal foils, or in forming copper foils of greater thicknesses.

BACKGROUND OF THE INVENTION

The basic technique in forming electrodeposited foil has not changed greatly over the years. In this respect, electrodeposited copper foil is generally formed by immersing a rotating drum cathode in an electrolytic solution containing copper ions. An anode formed from one or more arcuate sections of electrically conductive material is immersed in the electrolytic solution and positioned adjacent the drum cathode. The anode is formed to have a surface generally conforming to the curvature of the drum cathode so as to define a uniform inner electrode gap therebetween. Copper foil is formed on the rotating drum by applying a current, having a current density lower than the limiting current density of the electrolytic solution, to the anode and cathode. The electrodeposited foil is continually removed from the drum cathode as it emerges from the electrolytic solution so as to permit continuous foil production.

The actual production of copper foil begins through the nucleation of copper atoms on the surface of the drum cathode as the cathode initially enters the electrolytic solution. Copper continuously builds up onto these copper atoms as the drum continues to rotate past the energized anode through the electrolytic solution.

The current distribution at the entry point of the drum cathode surface has a significant effect on the quality of the copper nucleation. In this respect, copper nucleation is a rapid process, and it has been found that a uniform, sharp rise in current density at the point where the surface of the drum cathode enters the electrolytic solution can remarkably increase the density of copper formed on the drum, which in turn, reduces the porosity of the resulting foil. In other words, a quick current rise at the surface of the drum as it enters the electrolytic solution is critical for good copper nucleation. As the demand for thinner foils becomes greater, the initial copper nucleation on the drum surface becomes more important to insure porous-free copper foil.

Conventional electrolytic cells known heretofore have typically included anodes that were totally immersed in the electrolytic solution. Such arrangements produce slow current "ramping-up" as the drum cathode enters the electrolytic solution, which in turn, causes insufficient copper nucleation on the surface of the drum cathode. This slow current ramp-up occurs because the desired current density on the surface of the drum cathode does not occur until the surface of the drum is radially opposite the immersed anode. To improve the current ramping-up time, it has been known to place an insulator shield on the top (i.e., along the upper edge) of the immersed anode. While such an arrangement improves the current ramp up compared to an immersed anode alone, it does not completely eliminate the problem. To further improve the copper nucleation, it has also been known to use a strike anode (second anode) disposed near the surface of the electrolytic solution at the entry point of the surface of the drum cathode. The strike anode is energized at a higher current density than the main anode. A problem with this arrangement is that it requires a second rectifier to control the second anode, i.e., the strike anode. Moreover, though copper nucleation is improved using a strike anode, such a method does not totally eliminate the slow current ramping-up problem.

U.S. Pat. No. 5,833,819 to O'Hara et al. proposes the use of a partially immersed "net-type strike anode" instead of a solid strike anode to reduce ramping-up time. While this net-type strike anode significantly reduces current ramping-up time, and improves the copper nucleation, it still requires a second rectifier for operation. Moreover, both the aforementioned "strike anode" and the net-type strike anode disclosed in U.S. Pat. No. 5,833,819 disclose applying a higher current density to the surface of the drum cathode as it enters the electrolytic solution, and both require some type of insulator plate between the strike anode and the main anode.

The present invention overcomes these and other problems and provides an anode that eliminates slow current ramping-up problems, and does not require an insulator plate or a second rectifier for supplying a higher current density to the surface of the drum cathode.

SUMMARY OF THE INVENTION

In accordance with a preferred embodiment of the present invention, there is provided an apparatus for producing metal foil, comprising a drum cathode having an outer plating surface and an anode section. The drum cathode is partially immersed to a set level in an electrolytic solution and is rotatable about a generally horizontal axis. The anode section is comprised of a main anode portion immersed in the electrolytic solution. The main anode portion has a semi-cylindrical curved anode surface facing the drum cathode. The main anode portion is dimensioned to be spaced from the plating surface of the drum cathode so as to define a generally uniform gap therebetween. An anode extension portion is disposed at the upper end of the main anode. The anode extension portion has a first zone having at least one opening formed therein. The first zone is spaced a predetermined distance from the plating surface of the cathode and is immersed in the electrolytic solution wherein a portion of the first zone projects above the set level of the electrolytic solution. One energy source is connected to the anode assembly for energizing the main anode portion and the anode extension portion at the same electrical potential.

In accordance with an aspect of the present invention, there is provided an electrodeposition cell for electrodepositing metal onto a surface of a rotating drum that is partially immersed in an electrolytic solution. The cell includes an anode comprised of a main anode body portion and an anode extension portion. The main anode body portion has an arcuate main anode body surface having a radius of curvature slightly larger than the radius of curvature of the drum. The main anode body portion is totally immersed in the electrolytic solution adjacent the drum wherein a generally uniform gap is formed therebetween. The anode extension portion has an open, lattice-like structure and an anode extension surface facing the drum. The anode extension portion is disposed within the electrolytic solution wherein a portion thereof extends above the electrolytic solution such that the electrolytic solution can flow through the open lattice-like structure. A power source is connected to the main anode body portion and the anode extension portion to produce a like potential on the anode body surface and the anode extension surface, wherein the main anode body portion produces a first current density on the drum in a zone where the drum and the main anode body portion are adjacent and the anode extension portion produces a second current density on the drum in a zone where the drum and the anode extension portion are adjacent. The second current density is less than the first current density.

It is an object of the present invention to provide an anode assembly for use in electrodepositing metal onto a cathodic surface.

Another object of the present invention is to provide an anode assembly for use with a rotating drum cathode for producing high quality, porous-free metallic foil.

Another object of the present invention is to provide an anode assembly as described above having a portion thereof to facilitate good copper nucleation on the surface of a drum cathode.

Another object of the present invention is to provide an anode as described above that does not require strike anodes, insulation plates or secondary rectifiers.

These and other objects will become apparent from the following description of a preferred embodiment of the invention, taken together with the accompanying drawings.

BRIEF DESCRIPTION OF THE DRAWINGS

The invention may take physical form in certain parts and arrangement of parts, preferred embodiments of which will be described in detail in the specification and illustrated in the accompanying drawings which form a part hereof, and wherein.

DETAILED DESCRIPTION OF PREFERRED EMBODIMENT

Figure 1:
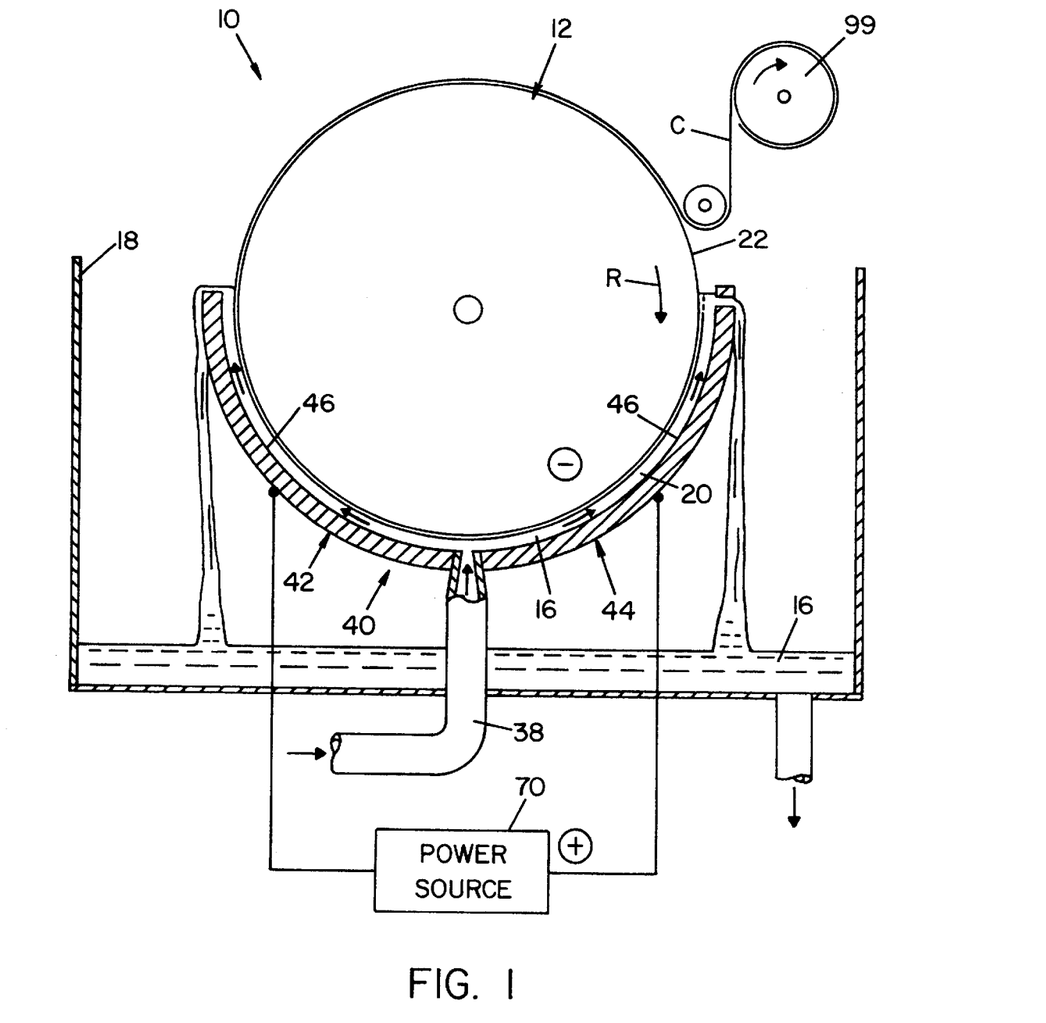
FIG. 1 is a partially sectioned, end elevational view of an electrolytic cell showing an anode assembly illustrating a preferred embodiment of the present invention.

Referring now to the drawings wherein the showings are for the purpose of illustrating a preferred embodiment of the invention only, and not for the purpose of limiting same, FIG. 1 shows an electroforming cell 10 for electroforming metal foil, illustrating a preferred embodiment of the present invention. The present invention is particularly applicable for forming copper foil, and will be described with reference thereto, although it will be appreciated from a further reading of the present disclosure that the present invention finds advantageous application in forming other metal foils.

Broadly stated, electroforming cell 10 is generally comprised of a drum cathode 12 and an anode assembly, designated 40 in the drawings. In the embodiment shown in FIG. 1, anode assembly 40 is comprised of a left anode section 42 and a right anode section 44. Anode sections 42, 44 are generally arcuate in shape and each have an anode surface 46 facing drum cathode 12. Sections 42, 44 are dimensioned to define a generally uniform inner electrode gap 20 between surfaces 46 of anode sections 42, 44 and drum cathode 12. Drum cathode 12 and anode sections 42, 44 are disposed within a tank 18 that is provided to collect an electrolytic solution 16 that flows through inner electrode gap 20.

Drum cathode 12 is generally cylindrical in shape and mounted by conventional means for rotation about a generally horizontal axis. Drum cathode 12 may be formed of any suitable electrically conductive metal or metal alloy, including lead, stainless steel, columbium, tantalum, titanium, or an alloy thereof, and has a polished plating surface, designated 22. Plating surface 22 may be formed from titanium, columbium, tantalum, chromium or an alloy thereof. According to the present invention, drum cathode 12 is preferably comprised of stainless steel and has a plating surface 22 formed of chromium. Drum cathode 12 may be rotated by any suitable drive motor arrangement (not shown) as is conventionally known in the art. Drum cathode 12 is preferably rotated in a fixed direction, designated by the arrow "R," at a circumferential speed that permits plating surface 22 to remain in contact with electrolytic solution 16 for a sufficient period of time to develop a desired foil thickness. It is understood in the art that metal ions are depleted during the electrodeposition process. Such metal ions are replenished by electrolytes from a reservoir (not shown).

Electrolytic solution 16 is continuously forced into gap 20 by a conduit 38, as is conventionally known in the art and as schematically illustrated in FIG. 1. The continuous circulation of electrolytic solution 16 through inner electrode gap 20 produces a flow of electrolytic solution 16 from the bottom of drum cathode 12 through inner electrode gap 20 up toward the upper ends of anode sections 42, 44. As shall be described in greater detail below, the level "L," as seen in FIGS. 2–8, of electrolytic solution 16 in gap 20 is defined by the shape and configuration of anode sections 42, 44 and the flow rate of electrolytic solution 16 in gap 20.

Figure 2:
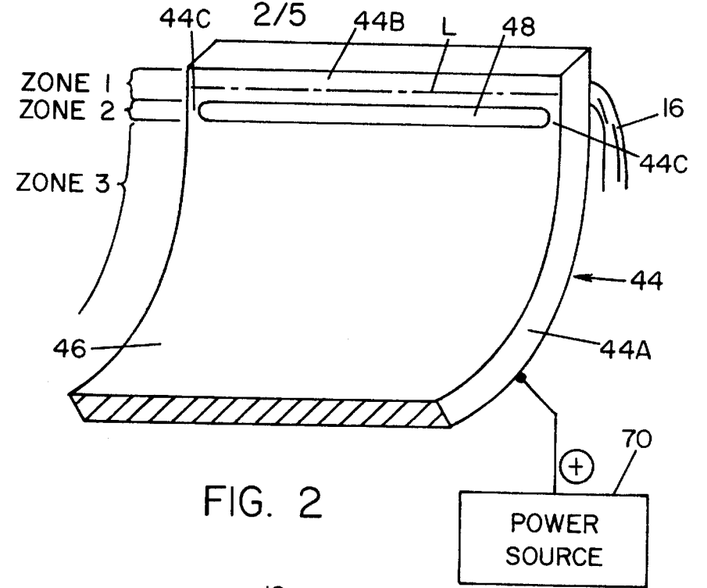
FIG. 2 is a perspective view of the anode assembly shown in FIG. 1.
Figure 3:
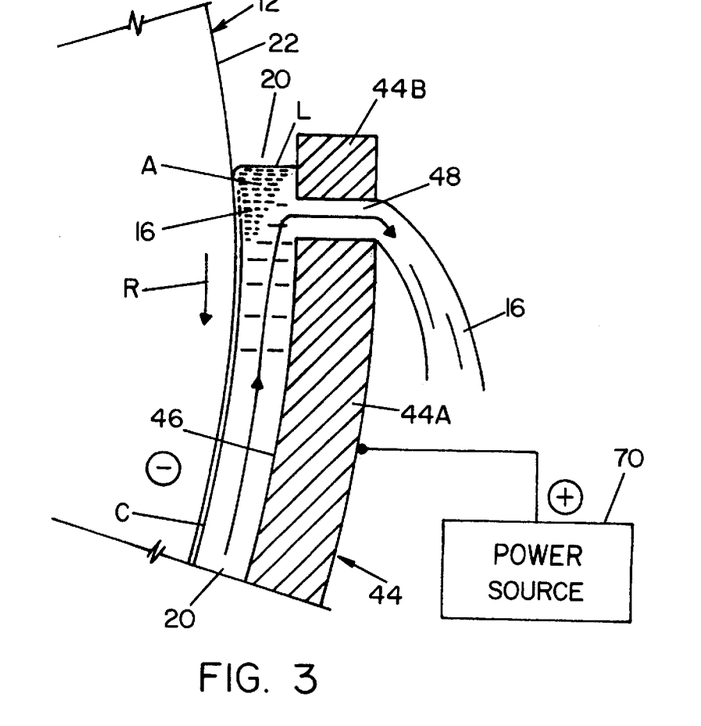
FIG. 3 is an enlarged sectional view of the upper portion of the anode assembly shown in FIG. 2.

Referring now to anode assembly 40, as indicated above, anode sections 42, 44 are generally arcuate in shape and are disposed adjacent drum cathode 12 to create an inner electrode gap 20. The present invention relates primarily to anode section 44, a preferred embodiment of which is seen in FIGS. 2 and 3. Anode section 44 is basically an arcuate plate having an arcuate anode surface 46 facing drum cathode 12. Anode section 44 may be formed of any electrically conductive material that is inert to the electrolytic solution. More specifically, anode section 44 is preferably formed from lead, titanium, tantalum, platinum, or a composite structure comprised of a copper core clad with one of the foregoing materials. In accordance with the present invention, at least one opening 48, best seen in FIGS. 2 and 3, is formed in the upper end of anode section 44. In the embodiment shown, opening 48 is an elongated slot that separates anode section 44, into a main anode portion 44A, an anode extension portion 44B and wall portions 44C that connect main anode portion 44A to anode extension portion 44B. As will be more fully understood from a further reading of the specification, the purposes of opening 48 are twofold. The first purpose is to define a passage through anode 44 through which electrolytic solution 16 may exit gap 20 without flowing over the top edge of anode 44. The second purpose is to define an anode extension portion 44B that is spaced from and above main anode portion 44A of anode section 44.

In accordance with one aspect of the present invention, opening 48 is configured and dimensioned in relation to the flow of electrolytic solution 16 in gap 20. Specifically, opening 48 is dimensioned such that electrolytic solution 16 reaches a level "L" within gap 20 that is at most, only slightly above the upper surface of anode section 44B. As used herein, the phrase "only slightly above" means less than about ½ inch. Preferably, surface level "L" of electrolytic solution 16 is above opening 48, but below the upper edge surface of anode section 44B. More preferably, the flow of electrolytic solution 16 is controlled such that only a very small portion of anode extension 44B extends above fluid level L, as best seen in FIG. 3.

As will be discussed in greater detail below, aperture 48 allows for electrolytic solution 16 that is forced up into inner electrode gap 20 to flow through anode section 44 to regions of the tank behind anode section 44. As best seen in FIG. 2, anode 44 basically defines three anode "zones." Anode extension portion 44B defines a first zone, designated "Zone 1," opening 48 defines a second zone, designated "Zone 2" and main anode portion 44A defines a third zone, designated "Zone 3."

Anode section 44 is connected to a power source, designated 70, to positively charge anode section 44. The power source 70, typically a rectifier, is operable to negatively charge drum cathode 12.

Referring now to the operation of cell 10, as best seen in FIG. 1, electrolytic solution 16 is forced into inner electrode gap 20 between anode section 44 and drum cathode 12 at a location near the bottom of drum cathode 12. This produces an upward flow of electrolytic solution 16 through inner electrode gap 20, as indicated by the arrow. As schematically illustrated in FIG. 3, electrolytic solution 16 will flow from inner electrode gap 20 through slot 48. Based upon the rate of flow of electrolytic solution 16 through gap 20, and the configuration and dimensions of slot 48, level "L" of electrolytic solution 16 is established relative to the face of anode extension portion 44B. The position of level "L" of electrolytic solution 16 relative to slot 48 produces an area "A" of electrolytic solution just above the upper edge of slot 48. In area A, the flow of electrolytic solution 16 is generally less than that flowing through aperture 48. As is conventionally known in the art, during an electrodeposition process, copper is plated out of electrolytic solution 16 as the copper foil is formed on surface 22 of drum cathode 12. Due to the relatively low flow of electrolytic solution 16 in area A, the metal ions plated out of solution in area A are not replaced as rapidly as those in front of main anode portion 44A. As a result of the relatively low flow of electrolytic solution 16 in area A, the ion concentration and thus the limiting current $i_L$ near surface L of electrolytic solution may be lower than in front of main anode portion 44A.

When electrodepositing metal, applicants believe that to form quality foil, it is necessary to build up the copper on plating surface 22 in three phases. During a first phase, nucleation and growth of the copper begins on plating surface 22 and is preferably maintained for a short period of time. During phase two, growth of copper on the newly formed copper crystals created in phase one is slowed down and grows at a low rate for a short period of time. During phase three, copper deposition on the newly formed layer of copper is obtained by applying the maximum level current density. Importantly, it is undesirable for the current density at any phase of the copper deposition to exceed the limiting current density $i_L$ of the electrolytic solution. Specifically, it is undesirable for the current density in area A to exceed the limiting current density $i_L$ of electrolytic solution 16 for prolonged periods of time in that operating under such conditions results in foil with poor mechanical properties and porosity.

In accordance with the present invention, anode section 44 provides three distinct zones to accomplish the three phases of copper deposition. As indicated above, anode section 44 is positively charged and drum 12 is negatively charged by power source 70. Since the same power source charges both the main anode portion 44A and the anode extension portion 44B, the electrical potential across the face of main anode portion 44A is the same as that on the face of anode extension portion 44B. Drum cathode 12 with plating surface 22 is rotated in a clockwise direction as illustrated by arrow R. At the point where plating surface 22 of drum cathode 12 first enters electrolytic solution 16, nucleation of copper on plating surface 22 begins. The electrical potential along the surface of anode extension portion 44B produces a specific current density on plating surface 22 of drum cathode 12. Although the electrical potential on the face of anode extension 44B is the same as the electrical potential along the face of anode portion 44A (both are connected to the same power source 70), the "current density" created on plating surface 22 of drum cathode 12 by anode extension portion 44B will generally be equal to slightly less than the "current density" created on plating surface 22 by main anode portion 44A because of opening 48. Despite this low flow in area A, the "current density" created by anode extension portion 44B on plating surface 22 of drum cathode 12 is nevertheless at a level sufficient to nucleate copper onto plating surface 22, without exceeding the limiting current $i_L$ of electrolytic solutions 16 in area A. Thus, copper nucleates on plating surface 22 as plating surface 22 traverses "Zone 1" defined by anode extension 44B.

Plating surface 22 then traverses "Zone 2" defined by slot 48. Because of the large open area defined by slot 48, the average current density on plating surface 22 in Zone 2 is lower than in Zone 1, and thus the growth of copper on plating surface 22 stops or is at a lower rate. Drum surface 22 then traverses main anode portion 44A that defines "Zone 3" wherein copper foil growth begins as drum surface 22 enters the high electrolyte flow region and high current density region where main anode portion 44A is opposite to plating surface 22. Copper foil growth continues as plating surface 22 rotates past anode section 44 arid later past energized anode section 42 to build up a copper foil designated C that is removed from drum 12 and collected onto a take-up roller 99.

Anode section 44 thus provides an integrally formed anode structure having three distinct deposition zones. In Zone 1, a current density is established by anode extension portion 44B that is commensurate with the lower limiting current of electrolytic solution 16 in area "A." The level of current density, however, being sufficient to nucleate metal onto plating surface 22. In Zone 2, the current density is lower than in Zone 1 so as to stop, or at least lower, the deposition rate established by Zone 1. In Zone 3, full metal build-up occurs at the high current density levels established by the main anode portion 44A.

The present invention thus provides what Applicants believe is an ideal energization profile for electrodeposition of metal in an electrodeposition process. It will, of course, be appreciated by those skilled in the art that the shape, i.e., length and width of slot 48 of anode extension portion 44B will affect the current density induced on drum cathode 12. It is desired that the anode extension portion 44B be designed such that the current density induced on drum cathode 12 by Zone 1 be at least 70% of that generated on drum cathode 12 by main anode portion 44A, and more preferably, be in the range of about 70% to about 85% of that generated on surface 22 of drum cathode 12 by main anode portion 44A. This reduced level of energization is sufficient to nucleate surface 22 of drum cathode 12 without exceeding the limiting current $i_L$ of electrolytic solution 16 in area "A" where drum cathode 12 first enters electrolytic solution 16.

Figure 4:
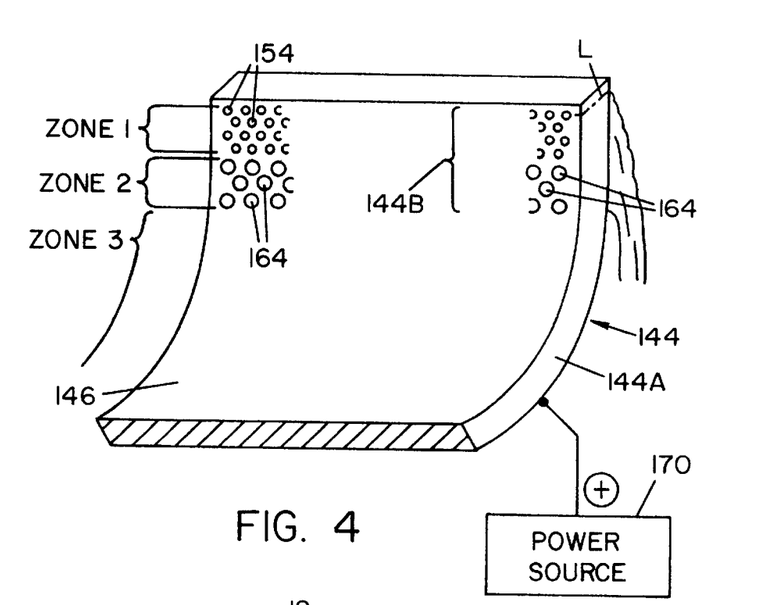
FIG. 4 is a perspective view of an anode assembly illustrating a first alternate embodiment of the present invention.
Figure 5:
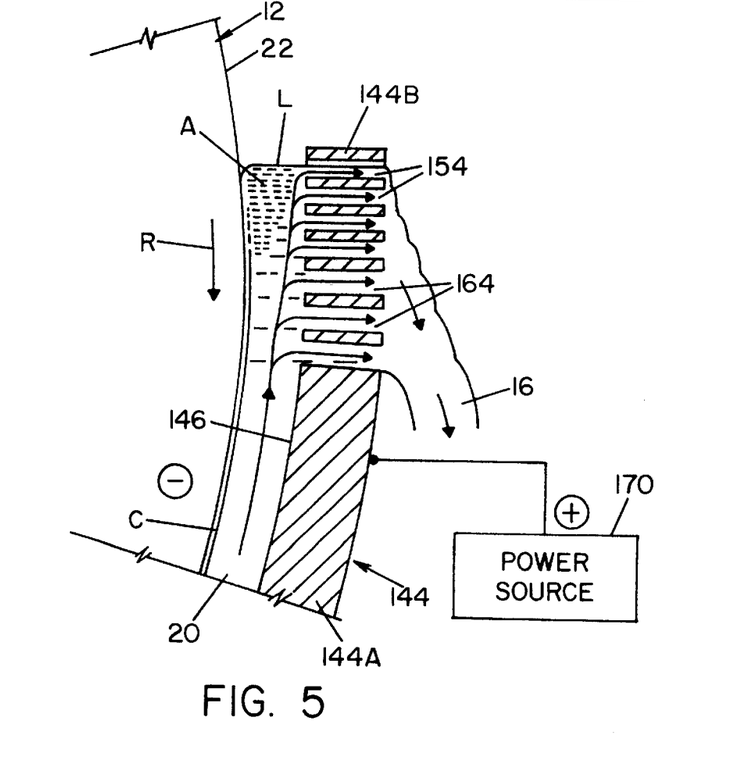
FIG. 5 is an enlarged sectional view of the upper portion of the anode assembly shown in FIG. 4.

Referring now to FIGS. 4 and 5, an anode section 144 illustrating an alternate embodiment of the invention is shown. Anode 144 has a main anode portion, designated 144A, and an anode extension portion, designated 144B. Main anode portion 144A and anode extension portion 144B are integrally formed, and together have the shape of a curved bar or plate. Anode section 144 has an anode surface 146. Main anode portion 144A comprises a major part of anode 144 and is dimensioned such that anode surface 146 of main anode portion 144A is totally immersed in electrolytic solution 16. Anode extension portion 144B is formed at the upper end of anode section 144 and is comprised of a first set of apertures 154 formed through the upper end or portion of the plate or bar forming anode section 144. In the embodiment shown, apertures 154 are cylindrical bores of like size that are equally spaced from one another. The size and spacing of apertures 154 of anode extension portion 144B are chosen to define an open, lattice-like structure, and to define a predetermined surface area facing drum cathode 12. In a preferred embodiment, the diameter of apertures 154 is less than the spacing defined between surface 22 of drum cathode 12 and anode surface 46 of anode section 44, and the spacing between aperture 154 is about equal to the diameter of aperture 154. As will be understood from a further reading of the present specification, apertures 154 of anode extension portion 144B may have shapes other than cylindrical. For example, slotted, square, triangular, rectangular or other geometric shapes may be formed through anode extension portion 144B. The purpose of apertures 154 is to produce an open, lattice-like structure at the upper end of anode section 144, to reduce the surface area of anode surface 146 facing drum cathode 12 and to allow the electrolytic solution 16 to pass through anode extension 144B. The region of anode extension portion 144B containing apertures 154 defines a "Zone 1" for nucleating copper onto plating surface 22 of drum cathode 12.

In the embodiment shown, anode extension portion 144B also includes a plurality of second apertures 164 extending through the plate forming anode section 144. Second apertures 164 are dimensioned to be larger than first apertures 154. Apertures 164 define an open, lattice-like structure and define a "Zone 2" in anode extension portion 144B. The anode surface area defined by apertures 164 in Zone 2 is significantly less than the anode surface area defined by apertures 154 in Zone 1. Like apertures 154, apertures 164 may be slotted, square, triangular, rectangular or some other geometric shape without deviating from the present invention. In the embodiment shown, apertures 164 are cylindrical and are dimensioned to be significantly larger than apertures 154. In a preferred embodiment, apertures 164 are about one and one-half times as large as apertures 154. Like apertures 154, apertures 164 provide an open, lattice-like structure that allows electrolytic solution 16 to pass therethrough from inner electrode gap 20 to an area behind the anode section 144. Apertures 164 in Zone 2 are specifically dimensioned to define an anode surface area in Zone 2 less than the anode surface area in Zone 1. The main anode portion 144A defines a Zone 3, as shown in the drawings.

Anode section 144 is connected to a power source, designated 170, to positively charge anode section 144. The power source 170, typically a rectifier, is operable to negatively charge drum cathode 12. Since the same power source charges both the main anode portion 144A and the anode extension portion 144B, the electrical potential created along the face of main anode portion 144A (i.e., Zone 3) is the same as that on the faces of Zones 1 and 2 of anode extension portion 144B.

The electrical potential on the surface of Zone 1 produces a specific current density on plating surface 22 of drum cathode 12. It will, of course, be appreciated by those skilled in the art that although the electrical potential on the face of anode extension portion 144B in Zone 1 is the same as the electrical potential across the face of main anode portion 144A (both are connected to the same power source 170), the current density created on plating surface 22 of drum cathode 12 by Zone 1 will be less than the current density created on plating surface 22 by main anode portion 144A because of the reduced surface area in Zone 1 created by apertures 154. The current density on plating surface 22 of drum cathode 12 created by Zone 1 of anode extension portion 144B, however, is at a level sufficient to nucleate copper onto plating surface 22, without exceeding the limiting current $i_L$ of electrolytic solution 16 in area "A." Zone 1 of anode extension portion 144B thus controls the crystal growth rate within the low flow region "A" of electrolytic solution 16 near surface level "L." The crystal growth is controlled by creating a proper current density (as measured on the surface of drum cathode 12) as drum cathode 12 first enters electrolytic solution 16.

Referring now to Zone 2, because of the larger ratio of open area (defined by apertures 164) to solid anode surface area in Zone 2, the average current density in Zone 2 is lower, and thus the growth of the copper onto plating surface 22 stops or is at a lower rate. Only in Zone 3 does full copper growth begin again when drum surface 22 enters the high electrolyte flow region and high current density region where main anode portion 144A is opposite plating surface 22.

Anode section 144 thus provides an integrally formed anode structure having three distinct deposition zones. In Zone 1, a current density is established by anode extension portion 144B that is commensurate with the lower limiting current of electrolytic solution 16 in area "A," the level of current density being sufficient to nucleate metal onto plating surface 22. In Zone 2, the current density is lower than in Zone 1 so as to stop, or at least lower, the deposition rate established by Zone 1. In Zone 3, full metal build-up occurs at the high current density levels established by the main anode portion 144A.

Anode section 144 thus provides an alternate embodiment of the present invention that also provides what is believed to be an ideal energization profile for electrodeposition of metal in an electrodeposition process. As will be appreciated by those skilled in the art, the diameter and spacing of apertures 154, 164 will of course affect the current density level and distribution on surface 22. In accordance with the present invention, it is desirable to size apertures 154, 164 and space them from each other wherein the current density induced on surface 22 of drum cathode 12 by Zone 1 is at least 70% of that generated on surface 22 by main anode portion 144A, and more preferably, is in the range of about 70% to about 85% of that generated on surface 22 by main anode portion 144A. The current density induced on surface 22 of drum cathode 12 by Zone 2 is less than that of Zone 1.

Figure 6:
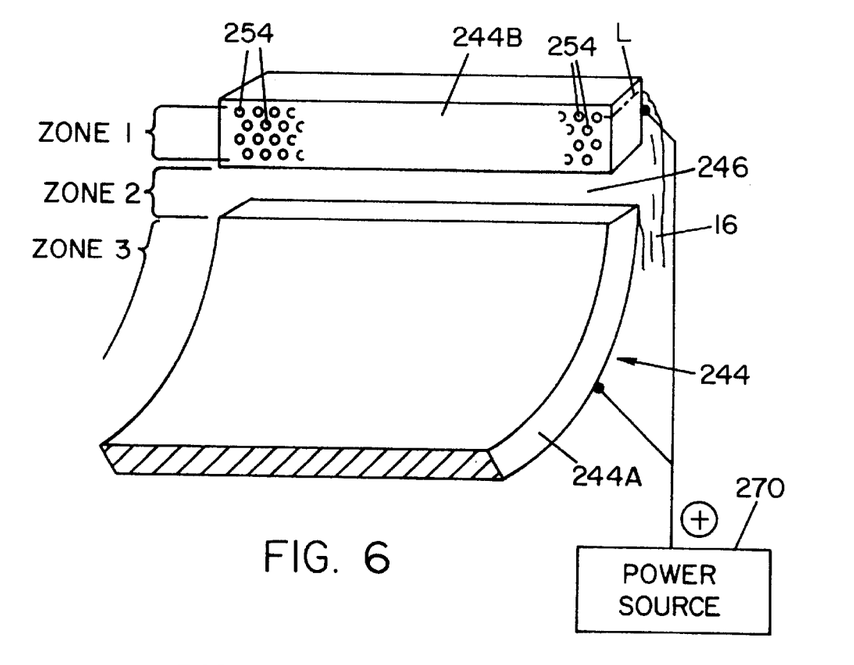
FIG. 6 is a perspective view of an anode assembly illustrating a second alternate embodiment of the present invention.

Referring now to FIG. 6, an anode section, designated 244, illustrates another embodiment of the present invention. Anode section 244 is comprised of a main anode 244A and a separate anode extension 244B. Anode extension 244B is adapted to be spaced from main anode 244A. Similar to anode extension portion 144B of the embodiment shown in FIGS. 4 and 5, anode extension 244B includes a plurality of apertures 254 that define a lattice-like structure. Apertures 254 may be slotted, rectangular, triangular, square or any other geometric shape. Unlike the embodiment shown in FIGS. 4 and 5, wherein part of anode extension portion 144B included a plurality of larger sized apertures 164 to define Zone 2, in the embodiment shown in FIG. 6, Zone 2 is defined by a void 246 (i.e., the spacing) defined between anode extension portion 244B and main anode portion 244A. As will be appreciated by those skilled in the art, anode extension portion 244B may be positioned within electrolytic solution 16 in a number of ways, such as by suspending anode extension portion 244B from above, or by attaching it with support plates to main anode portion 244A. In accordance with the present invention, both anode extension portion 244B and main anode portion 244A are connected to a power source 270 so as to create a uniform electrical potential on the surfaces of anode extension portion 244B and main anode portion 244A.

As with the prior embodiments disclosed in FIGS. 1–5, anode extension portion 244B is adapted to be partially immersed in electrolytic solution 16, as schematically shown in FIG. 6, wherein only a small portion of anode extension 244B extends above the surface level "L" of electrolytic solution 16. Main anode 244A is dimensioned to be totally immersed within electrolytic solution 16, as is conventionally known.

Anode section 244 basically operates in a manner similar to that previously described with respect to anode sections 44 and 144. In this respect, as plating surface 22 of drum cathode 12 first enters electrolytic solution 16, nucleation of copper on plating surface 22 begins. As in the prior embodiments, because electrolytic solution 16 in this region of gap 20 may have a lower limiting current, the lower current density created by apertures 254 formed in anode extension portion 244B results in a current that does not exceed the limiting current of electrolytic solution 16 and further results in a uniform nucleation of copper on plating surface 22 of drum cathode 12. This initial nucleation is followed by a period of low growth, or no growth, as drum cathode 12 passes by void 246 defined between anode extension portion 244B and main anode portion 244A. Full growth of the metal begins when plating surface 22 of drum cathode 12 enters the high flow region and high current density region of main anode 244A. The embodiment disclosed in FIG. 6 thus produces the same net effect as the previous embodiments, but illustrates how an existing anode 244A can be modified through the addition of a perforated or lattice-like anode extension portion 244B. As indicated above, anode extension portion 244B is energized at the same current level as main anode 244A, and more preferably, by the same power source 270 so that the electrical potential along the surface of anode extension portion 244B is the same as the electrical potential along the surface of main anode portion 244A. The reduced surface area of the anode extension portion 244B creates a reduced current density in Zone 1, but one that is sufficient to nucleate plating surface 22 of drum cathode 12 as plating surface 22 enters electrolytic solution 16.

Figure 7:
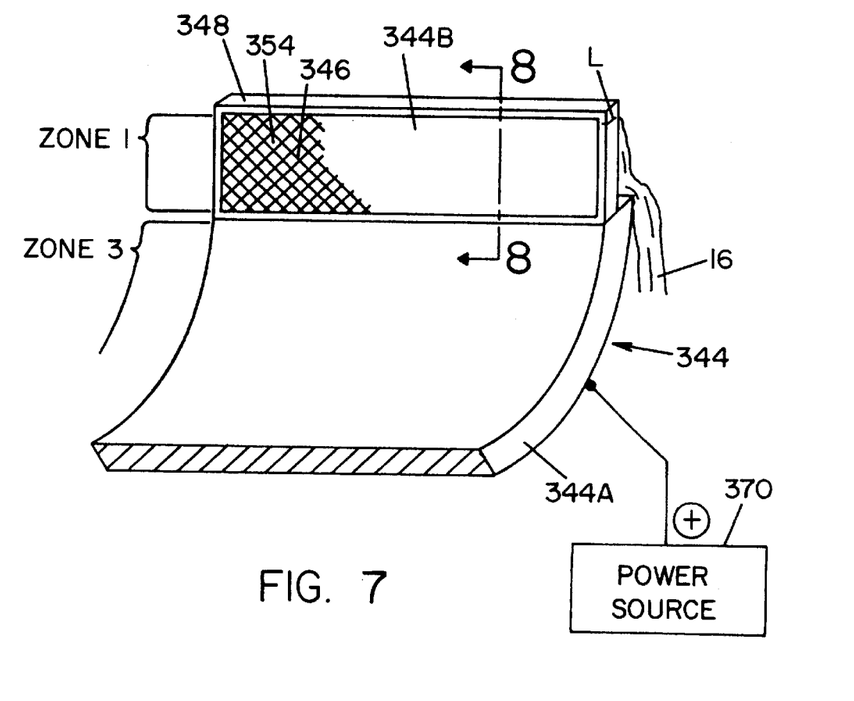
FIG. 7 is a perspective view of an anode assembly illustrating a third alternate embodiment of the present invention.
Figure 8:
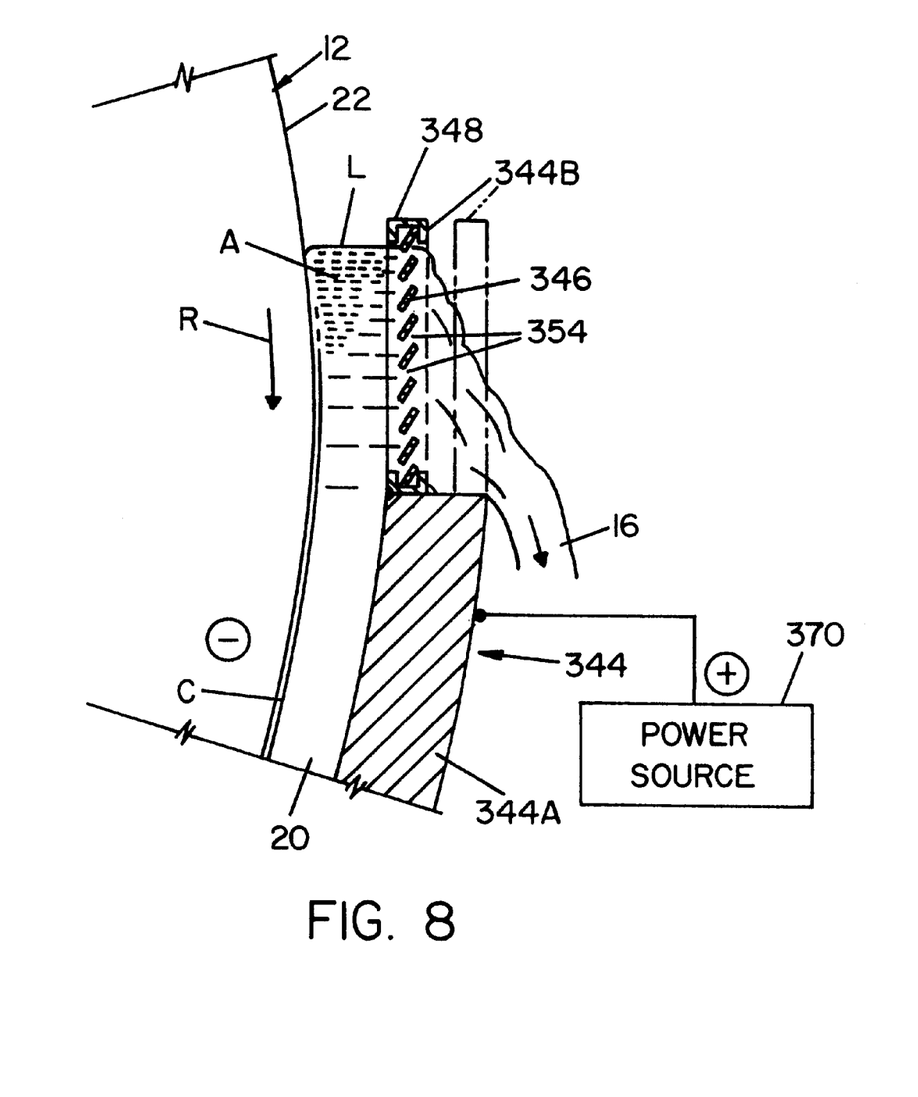
FIG. 8 is an enlarged sectional view taken along lines 8—8 of the upper portion of the anode assembly shown in FIG. 7.

Referring now to FIG. 7, a still further embodiment of the present invention is shown. FIG. 7 shows an anode section, designated 344, comprised of a main anode 344A and an anode extension portion 344B. Anode extension portion 344B is preferably formed of a sheet 346 of an open woven metal or expanded metal mesh. Sheet 346 is secured to a frame 348 that is secured to main anode section 344A. The woven wire or expanded metal sheet 346 has openings 354 and has an open lattice-like structure as in the prior embodiments. Anode extension portion 344B is secured to the upper end of main anode section 344A, preferably in a manner, such as welding, wherein a good electrically conductive path is formed between main anode portion 344A and anode extension portion 344B. In this respect, frame 348 is preferably formed of a like, or compatible, material as main anode portion 344A. Anode extension portion 344B is dimensioned such that when the main anode portion 344A is immersed within electrolytic solution 16, a portion of anode extension portion 344B extends above surface level "L" of electrolytic solution 16. As with the previous embodiments, main anode portion 344A is connected to a power source 370. Since metal sheet 346, forming anode extension portion 344B, is attached to main anode portion 344A, the electrical potential across the metal sheet 346 will be the same as the electrical potential along the surface of main anode portion 344A. Depending on the shape and structure of sheet 346, a specific current density will be created on surface 22 of drum cathode 12. The current density on surface 22 produces nucleation of metal on plating surface 22 of drum cathode 12, as drum cathode 12 enters electrolytic solution 16, in a manner as previously described. As will be appreciated, nucleation and metal build-up will occur across the entire area defined by the mesh sheet 346, and full growth will begin when plating surface 22 reaches the main anode portion 344A. Although this embodiment does not include a "zone" or "region" of reduced growth, it is believed that satisfactory results may nevertheless be obtained by utilizing expanded metal or open metal sheet 346 in the configuration as shown, as long as expanded metal sheet 346 is energized to have the same electrical potential as main anode portion 344A. It is also appreciated that a woven wire (mesh) or expanded metal sheet 346 may affect the current density created on surface 22, as compared to the prior embodiment. As noted above, it is desired that an anode extension portion produce at least 70%, and more preferably, about 70% to about 85% of the current density generated by main anode portion 344A. Because there is no Zone 2 of lower current density in the embodiment, it may be desirable to reduce the current density created by anode extension portion 344B on drum surface 22 below 70% of the current density of main anode portion 344A. To this end, the position of sheet 346 relative to plating surface 22 may be adjusted as illustrated in phantom in FIG. 8.

The present invention thus provides an anode assembly wherein an anode extension portion or separate anode section may be configured to nucleate plating surface 22 of drum cathode 12 as drum cathode 12 enters electrolytic solution 16. Importantly, in each of the embodiments, the anode structure has the same electrical potential as the main portion of the anode. Thus, separate rectifiers or energy sources are not required for each of the respective anode sections. Moreover, it is believed that the current density of an anode extension portion will be below that of a main anode section due to the opening(s) in the anode structure in the vicinity where drum cathode 12 enters electrolytic solution 16.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. An apparatus for producing metal foil, comprising:
   a drum cathode having an outer plating surface, said cathode being partially immersed to a set level in an electrolytic solution and being rotatable about a generally horizontal axis;
   an anode assembly, comprised of:
      a main anode portion immersed in said electrolytic solution, said main anode portion having a semi-cylindrical curved anode surface facing said drum cathode, said main anode portion being dimensioned to be spaced from said plating surface of said drum cathode so as to define a generally uniform gap therebetween, and
      an anode extension portion disposed at the upper end of said main anode, said anode extension portion having a first zone having at least one opening formed therein, said first zone being spaced a predetermined distance from said plating surface of said cathode, at least a portion of said anode extension being immersed in said electrolytic solution; and
      one energy source connected to said anode assembly for energizing said main anode portion and said anode extension portion at the same electrical potential.

2. An apparatus as defined in claim 1, wherein said anode extension portion is an integral part of said main anode portion.

3. An apparatus as defined in claim 2, wherein said energy source is attached to said main anode portion.

4. An apparatus as defined in claim 3, wherein said first zone is comprised of a plurality of apertures formed through said anode extension.

5. An apparatus as defined in claim 4, wherein said anode assembly includes a second zone disposed between said first zone and said main anode portion, said second zone of said anode assembly producing a current density on the plating surface of drum cathode that is less than the current density of said first zone.

6. An apparatus as defined in claim 5, wherein said anode extension portion is separate from said main anode portion and said second zone of said anode assembly is defined by a void disposed between said main anode portion and said anode extension portion.

7. An apparatus as defined in claim 5, wherein said anode extension portion is an integral extension of said main anode portion and said second zone of said anode assembly is defined by a plurality of second apertures formed in said anode extension portion, said apertures in said second zone being larger than the apertures in said first zone.

8. An apparatus as defined in claim 7, wherein said apertures in said first and second zones are cylindrical bores.

9. An apparatus as defined in claim 7, wherein the spacing between the apertures in Zone 1 is approximately equal to the diameter of the apertures, and the diameter of the apertures is less than the spacing defined between said drum cathode and said main anode portion.

10. In an electrodeposition cell for electrodepositing metal onto a surface of a rotating drum that is partially immersed in an electrolytic solution, an anode comprised of:
    a main anode body portion having an arcuate main anode body surface having a radius of curvature slightly larger than the radius of curvature of said drum, said main anode body portion being totally immersed in said electrolytic solution adjacent said drum wherein a generally uniform gap is formed therebetween;
    an anode extension portion having an open, lattice-shaped structure and an anode extension surface facing said drum, said anode extension portion being disposed within said electrolytic solution wherein said electrolytic solution can flow through said open lattice-shaped structure; and
    a power source connected to said main anode body portion and said anode extension portion to produce a like potential on said anode body surface and said anode extension surface, wherein said main anode body portion produces a first current density on said drum in a zone where said drum and said main anode body portion are adjacent and said anode extension portion produces a second current density on said drum in a zone where said drum and said anode extension portion are adjacent, said second current density being less than said first current density.

11. An anode as defined in claim 10, wherein said anode extension portion is comprised of a sheet of expanded metal.

12. An anode as defined in claim 10, wherein said anode extension portion is an integral extension of said main anode body portion, and said open lattice structure is defined by a first grouping of spaced apart first apertures formed through said anode extension portion.

13. An anode as defined in claim 12, wherein said first apertures are cylindrical bores extending through said anode extension portion.

14. An anode as defined in claim 10, wherein said anode extension portion includes a second grouping of second apertures, disposed between said first grouping of apertures and said main anode body portion, said apertures being larger than said first apertures wherein said second grouping produces a third current density on said drum that is less than said second current density.

15. An anode as defined in claim 14, wherein said second apertures are cylindrical bores extending through said anode extension portion.

16. An anode as defined in claim 10, wherein said anode extension portion is a separate component spaced from said main anode portion.

17. An anode as defined in claim 16, wherein said anode extension is comprised of a block having a plurality of apertures formed therethrough.

18. An anode as defined in claim 17, wherein said apertures are cylindrical bores.

19. An anode as defined in claim 10, wherein the current density created by said anode extension portion is at least 70% of the current density of said main anode body portion.

20. An anode as defined in claim 10, wherein a portion of said anode extension extends above said electrolytic solution.

* * * * *